United States Patent [19]

Wilson

[11] 4,176,720

[45] Dec. 4, 1979

[54] WELL CEMENTING IN PERMAFROST

[75] Inventor: William N. Wilson, Plano, Tex.

[73] Assignee: Atlantic Richfield Company, Los Angeles, Calif.

[21] Appl. No.: 928,648

[22] Filed: Jul. 27, 1978

[51] Int. Cl.$^2$ .............................................. E21B 33/14
[52] U.S. Cl. ................................... 166/293; 106/104; 166/DIG. 1; 175/66
[58] Field of Search ................. 166/DIG. 1, 293, 294, 166/292; 175/65, 66; 106/104

[56] References Cited

U.S. PATENT DOCUMENTS

| | | | |
|---|---|---|---|
| 2,582,459 | 1/1952 | Salathiel | 166/293 X |
| 2,609,882 | 9/1952 | Morgan et al. | 166/292 |
| 3,581,825 | 6/1971 | Messenger | 166/292 |
| 3,937,282 | 2/1976 | Shryock et al. | 166/DIG. 1 X |
| 4,065,318 | 12/1977 | Detroit et al. | 166/293 X |

OTHER PUBLICATIONS

Stude, "High Alumina Cement Solves Permafrost Cementing Problems", *Petroleum Engineer*, Sep. 1969, pp. 64–66.

*Primary Examiner*—Stephen J. Novosad
*Attorney, Agent, or Firm*—Roderick W. MacDonald

[57] ABSTRACT

A process for cementing a string of pipe in the permafrost region of a borehole of a well wherein aqueous drilling fluid actually used in drilling the wellbore in the permafrost region of a wellbore is employed. The drilling fluid contains or is adjusted to contain from about 2 to about 16 volume percent solids. Mixing with the drilling fluid (1) an additive selected from the group consisting of lignosulfonate, lignite, tannin, and mixtures thereof, (2) sufficient base to raise the pH of the drilling fluid into the range of from about 9 to about 12, and (3) cementitious material which will harden in from about 30 to about 40 hours at 40° F. The resulting mixture is pumped into the permafrost region of a wellbore to be cemented and allowed to harden in the wellbore. There is also provided a process for treating an aqueous drilling fluid after it has been used in drilling the wellbore in permafrost, and a cementitious composition for cementing in a permafrost region of a wellbore.

12 Claims, No Drawings

WELL CEMENTING IN PERMAFROST

BACKGROUND OF THE INVENTION

Heretofore in drilling wells through permafrost regions the drilling fluid used to drill the well has been discarded or otherwise disposed of after which a separate cementitious material has been pumped into the wellbore for cementing as desired. Because permafrost drilling regions are often isolated in nature, the costs of transporting drilling fluid materials and cementing materials are quite high and any savings in this area can be substantial.

SUMMARY OF THE INVENTION

According to this invention it has been discovered that drilling fluid actually used in drilling a wellbore in permafrost can be employed as a major constituent in the cementing materials that are employed in cementing a permafrost wellbore.

By this invention the drilling fluid previously used is conserved and, therefore, replaces a substantial amount of cementing material which would otherwise be transported to the drill site at substantial expense.

In accordance with this invention it has been found that if the drilling fluid previously used in drilling a wellbore in permafrost contains or is adjusted to contain from about 2 to about 16 volume percent solids based on the total volume of the drilling fluid, the solids being any type of solid particulate matter including drill cuttings from the drilling operation, the drilling fluid can be recovered from the wellbore and used as the base material for building the cementitious mixture to be used for cementing in the same or other permafrost wellbores. The used drilling fluid with required volume percent solids is first mixed with an additive selected from the group consisting of lignosulfonate, lignite, tannin, and mixtures thereof, and sufficient base to raise the pH of the mixture into the range of from about 9 to about 12. At the same time as the mixing of the additive and/or thereafter, cementitious material which will harden in from about 30 to about 40 hours depending upon the amount of additive present when held at 40° F. is also added to the drilling fluid. If desired, a friction reducer or dispersant can be employed to improve pumpability. Such additives are well known in the art. Thereafter the resulting final mixture is pumped into the permafrost region of the wellbore which is to be cemented and is allowed to set in the wellbore until it hardens to the desired extent.

This invention also relates to a process for treating an aqueous drilling fluid after it has been used in drilling a wellbore in permafrost by following the steps outlined hereinabove.

This invention also relates to a cementitious composition for cementing pipe in a permafrost region of a wellbore which employs used aqueous drilling fluid along with the additive, base, and cementitious material as described above.

Accordingly, it is an object of this invention to provide a new and improved method and composition for cementing wellbores in permafrost regions.

Other aspects, objects and advantages of this invention will be apparent to those skilled in the art from this disclosure and the appended claims.

DETAILED DESCRIPTION OF THE INVENTION

More specifically, this invention relates to a process for cementing a string of pipe or any other desired item in the permafrost region of a wellbore by recovering at least part of the aqueous drilling fluid used in drilling a wellbore in the permafrost region, not necessarily the same wellbore, and analyzing the thus recovered drilling fluid for its solids content. If the solids content of the drilling fluid is already in the range of from about 2 to about 16 volume percent based on the total volume of the drilling fluid, it is suitable for use as a base for the cementitious material to be prepared in accordance with this invention. If the solids content is not within the above-noted range, it should be adjusted to within that range by the addition of any suitable particulate solids. The particular type of solids, e.g., sand, gravel, clay, etc., present and the size gradation of the solids is not as important as the total volume percent of solids present.

Once the drilling fluid with a proper solids content is obtained, there is mixed therewith an additive selected from the group consisting of lignosulfonate, lignite, tannin, and mixtures thereof, in an amount of from about 0.05 to about 0.4 pounds per barrel per equivalent pounds per barrel of bentonite as determined by the methylene blue test as set forth by the American Petroleum Institute (API) RP13B Section 9. The additive is preferably chrome lignosulfonate. At the same time that the additive is mixed with the drilling fluid and/or after the additive is mixed with the drilling fluid, cementitious material which will harden in from about 30 to about 40 hours (depending on the amount of lignosulfonate present) while sitting essentially quiescent at about 40° F. is mixed with the drilling fluid in an amount of from about 50 to about 250 pounds of cementitious material per barrel (42 gallons per barrel) of drilling fluid plus additives. A wide variety of cements meeting the 30 to 40 hour at 40° F. test are available and well known to those skilled in the art, a particularly desirable cement being one which is a high alumina cement. Preferably the cementitious material employed in this invention is a high (at least about 40 weight percent) alumina calcium aluminate cement. A particularly suitable commercially available cementitious material is fondu.

Also essentially contemperaneous with and/or after mixing of the additive with the base drilling fluid and before, or at the same time, as the addition of the cementitious material, sufficient base is added so that the pH of the final mixture is in the range of from about 9 to about 12.

This final mixture is then used as the cementing material for the permafrost wellbore and is simply pumped into the permafrost region of the wellbore to be cemented and allowed to set until it hardens in the wellbore. A known friction reducer can be used to improve pumpability.

Any suitable base material which is nondeleterious to the drilling fluid, additive, and cementitious material can be used such as sodium hydroxide, calcium hydroxide, magnesium hydroxide, and the like, as will be well known and obvious to those skilled in the art.

As would be quite obvious to those skilled in the art, the particular formulation employed with a given drilling fluid will vary widely depending on the particular type of well being drilled and the location of the drilling site. Generally, by following the above guidelines, drilling fluid used in drilling a wellbore through permafrost can be utilized as a major constituent in the cementing material thereby substantially reducing the cost of cementing materials and the transportation thereof.

This invention also relates to a process for treating an aqueous drilling fluid after it has been used in drilling a wellbore in permafrost wherein the drilling fluid either already contains or is adjusted to contain from about 2 to about 16 volume percent solids, comprising mixing with the drilling fluid an additive as above-described and in amounts as above-described and then essentially contemporaneously with and/or subsequent to the addition of the additive or additives, mixing with the drilling fluid sufficient base or bases to raise the pH of the mixture into the range of from about 9 to about 12, and then at least one cementitious material as described above and in amounts described above.

Of course, in any embodiment of this invention if the pH is already within the range of 9 to 12, no base need be added in order to practice this invention.

This invention also relates to cementitious composition for cementing pipe or other items in a permafrost region of the wellbore which composition consists essentially of aqueous drilling fluid used in drilling through permafrost and having a solids content of from about 2 to about 16 volume percent, from about 0.01 to about 1.5 weight percent based on the total weight of the composition of an additive selected from the group consisting of lignosulfonate, lignite, tannin, and mixtures thereof, and from about 8 to about 40 weight percent based on the total weight of the composition of at least one cementitious material which will harden in from about 30 to about 40 hours at about 40° F., the composition having a pH in the range of from about 9 to about 12.

The water base of the drilling fluid is preferably essentially fresh water and not salt water or brine.

As would be obvious to those skilled in the art, various accelerators and/or retarders known to speed up or slow down the setting up or hardening of the cement can be employed in this invention. Further, the addition of heat to the cement as it rests in the wellbore and/or during or before pumping into the wellbore can be employed to speed up the setting up time of the cementitious mixture of this invention.

Generally, this invention produces a low solids cement utilizing drilling fluid that would otherwise be discarded.

Oftentimes conventional drilling fluids employed in permafrost regions contain large amounts of bentonite, polymers such as high molecular weight polyacrylates, xanthan gum or other similar materials, as well as solids and fresh water. Such drilling fluid additives are tolerable in forming the cementitious material of this invention.

Although a requirement of the drilling fluid used in this invention is that it contains from about 2 to about 16 volume percent solids, it is also desirable, but not required in the broadest aspect of this invention, that all or a substantial portion of the solids be no larger than 200 mesh (U.S. Sieve Series).

EXAMPLE

Fresh water containing 8.7 volume percent (based on the volume of the whole drilling fluid) of 200 mesh and smaller bentonitic clay solids and 0.265 volume percent based on the volume of whole drilling fluid of sand was taken from a well drilled in permafrost in Alaska. To this drilling fluid was first added six pounds per barrel of chrome lignosulfonate with mixing. Thereafter, 1.5 pounds per barrel of sodium hydroxide and then 130 pounds per barrel of Lafarge fondu was added. All mixing was carried out at ambient temperature and pressure until an intimate mixture of all materials was achieved by observation. The American Petroleum Institute fluid loss value for the resulting cementitious mixture was about 10 cubic centimeters for 30 minutes. The resulting mixture hardened while setting under quiescent conditions at 40° F. in about 40 hours. The resulting mixture was hardened into test cylinders 3 inches in diameter and about 8 inches long and was tested for its elastic modulus under pressure, the pressure simulating the permafrost overburden pressure that the cement would encounter in place of a wellbore. Results were as follows:

| Confining Pressure, PSI | Average Elastic Modulus, PSI |
|---|---|
| 400 | 92,223 |
| 200 | 77,810 |
| 100 | 64,075 |

Additional tests under the same confining pressures were conducted with similar cylinders and the results were:

| Confining Pressure, PSI | Average Elastic Modulus, PSI |
|---|---|
| 400 | 82,134 |
| 200 | 74,304 |
| 100 | 65,673 |

Reasonable variations and modifications are possible within the scope of this disclosure without departing from the spirit and scope of this invention.

The embodiments of the invention in which an exclusive property or privilege is claimed are defined as follows:

1. A process for cementing in the permafrost region of a wellbore comprising recovering at least part of the aqueous drilling fluid used in drilling a wellbore in the permafrost region, said drilling fluid containing from about 2 to about 16 volume percent solids, mixing with said drilling fluid an additive selected from the group consisting of lignosulfonate, lignite, tannin, and mixtures thereof in an amount of from about 0.05 to about 0.4 pounds per barrel per equivalent pounds per barrel of bentonite as determined by the methylene blue test, essentially contemporaneous with and/or subsequent to the addition of said additive, mixing with said drilling fluid sufficient of at least one base to raise the pH of the mixture into the range of from about 9 to about 12 and from about 50 to about 250 pounds per barrel of at least one cementitious material which will harden in from about 30 to about 40 hours at about 40° F., pumping the resulting final mixture into the permafrost region of the wellbore to be cemented, and allowing said mixture to harden in said wellbore.

2. A process according to claim 1 wherein said additive is chrome lignosulfonate and said base is sodium hydroxide.

3. A process according to claim 2 wherein said cementitious material is high in alumina calcium aluminate.

4. A process according to claim 2 wherein said cementitious material contains a substantial amount of fondu cement.

5. A process according to claim 1 wherein said cementitious material is high in alumina.

6. A process according to claim 1 wherein said cementitious material contains a substantial amount of fondu cement.

7. A process for treating an aqueous drilling fluid after it has been used in drilling a wellbore in permafrost, said drilling fluid containing from about 2 to about 16 volume percent solids, comprising mixing with said drilling fluid an additive selected from the group consisting of lignosulfonate, lignite, tannin, and mixtures thereof in an amount of from about 0.05 to about 0.4 pounds per barrel per equivalent pounds per barrel of bentonite as determined by the methylene blue test, essentially contemporaneous with and/or subsequent to the addition of said additive, mixing with said drilling fluid sufficient of at least one base to raise the pH of the mixture into the range of from about 9 to about 12 and from about 50 to about 250 pounds per barrel of at least one cementitious material which will harden in from about 30 to about 40 hours at about 40° F.

8. A process according to claim 7 wherein said additive is chrome lignosulfonate and said base is sodium hydroxide.

9. A process according to claim 8 wherein said cementitious material is high in alumina calcium aluminate.

10. A process according to claim 8 wherein said cementitious material contains a substantial amount of fondu cement.

11. A process according to claim 7 wherein said cementitious material is high in alumina.

12. A process according to claim 7 wherein said cementitious material contains a substantial amount of fondu cement.

* * * * *